(12) United States Patent
Chang (10) Patent No.: US 11,047,523 B1
(45) Date of Patent: Jun. 29, 2021

(54) TRIPOD

(71) Applicant: KUPO CO., LTD., New Taipei (TW)

(72) Inventor: Hung-Yueh Chang, Taipei (TW)

(73) Assignee: Kupo Co., Ltd., New Taipei (TW)

( * ) Notice: Subject to any disclaimer, the term of this patent is extended or adjusted under 35 U.S.C. 154(b) by 0 days.

(21) Appl. No.: 17/003,005

(22) Filed: Aug. 26, 2020

(51) Int. Cl.
| | |
|---|---|
| *F16M 11/00* | (2006.01) |
| *F16M 11/24* | (2006.01) |
| *F16M 11/10* | (2006.01) |
| *F16M 11/28* | (2006.01) |
| *F16M 11/16* | (2006.01) |
| *F16M 11/38* | (2006.01) |
| *F16M 11/32* | (2006.01) |

(52) U.S. Cl.
CPC ............. *F16M 11/24* (2013.01); *F16M 11/10* (2013.01); *F16M 11/16* (2013.01); *F16M 11/245* (2013.01); *F16M 11/28* (2013.01); *F16M 11/32* (2013.01); *F16M 11/38* (2013.01); *F16M 2200/027* (2013.01); *F16M 2200/08* (2013.01)

(58) Field of Classification Search
CPC ........ F16M 11/28; F16M 11/24; F16M 11/32; F16M 11/38; F16M 11/16; F16M 11/245; F16M 2200/027; F16M 2200/08; F17M 11/10
USPC ......... 248/523, 528, 125.7, 125.8, 165, 166, 248/170, 171, 173, 188.2, 186.2, 188.7, 248/188.8, 354.3, 354.4, 354.5; 84/421
See application file for complete search history.

(56) References Cited

U.S. PATENT DOCUMENTS

| | | | | |
|---|---|---|---|---|
| 5,072,910 A | * | 12/1991 | May ....................... | F16M 11/10 248/412 |
| 5,794,899 A | * | 8/1998 | Tamllos .................. | F41A 23/12 248/166 |
| 5,863,015 A | * | 1/1999 | Hsu ....................... | F16M 11/242 248/157 |
| 6,491,266 B1 | * | 12/2002 | Chen ...................... | F16M 11/16 248/163.1 |
| 7,438,266 B2 | * | 10/2008 | May ....................... | G10D 13/28 248/163.1 |
| 7,802,764 B2 | * | 9/2010 | Leinen ................. | A61M 5/1415 248/129 |
| 8,664,500 B2 | * | 3/2014 | Shimada ................ | F16M 11/28 84/421 |
| 2013/0042745 A1 | * | 2/2013 | Shimada ................ | G10D 13/02 84/421 |
| 2020/0209715 A1 | * | 7/2020 | Christensen ........... | F16M 11/28 |

* cited by examiner

*Primary Examiner* — Tan Le
(74) *Attorney, Agent, or Firm* — Rosenberg, Klein & Lee (57) ABSTRACT

A tripod has an upright rod, a stationary rod, a rotatable rod, a slidable rod, and a positioning assembly. Connecting ends of the stationary rod, the rotatable rod, and the slidable rod are mounted to the upright rod. The positioning assembly is mounted inside the upright rod and includes a locking element and at least one compression spring. The rotatable rod is able to pivot to allow a positioning hole of the rotatable rod to align with a first through hole of the upright rod. As a height position of the slidable rod is adjusted, the locking element is pushed by the at least one compression spring to allow the locking element to fix the rotatable rod at the specific angular position. Accordingly, it is convenient and time saving for a user to unfold or fold the tripod.

18 Claims, 10 Drawing Sheets

TRIPOD

BACKGROUND OF THE INVENTION

1. Field of the Invention

The present invention relates to a tripod for stabilizing and elevating a camera, a flash unit, or other photographic equipment, especially to a tripod that is able to be fold or unfold.

2. Description of the Prior Art(s)

Figure 8:
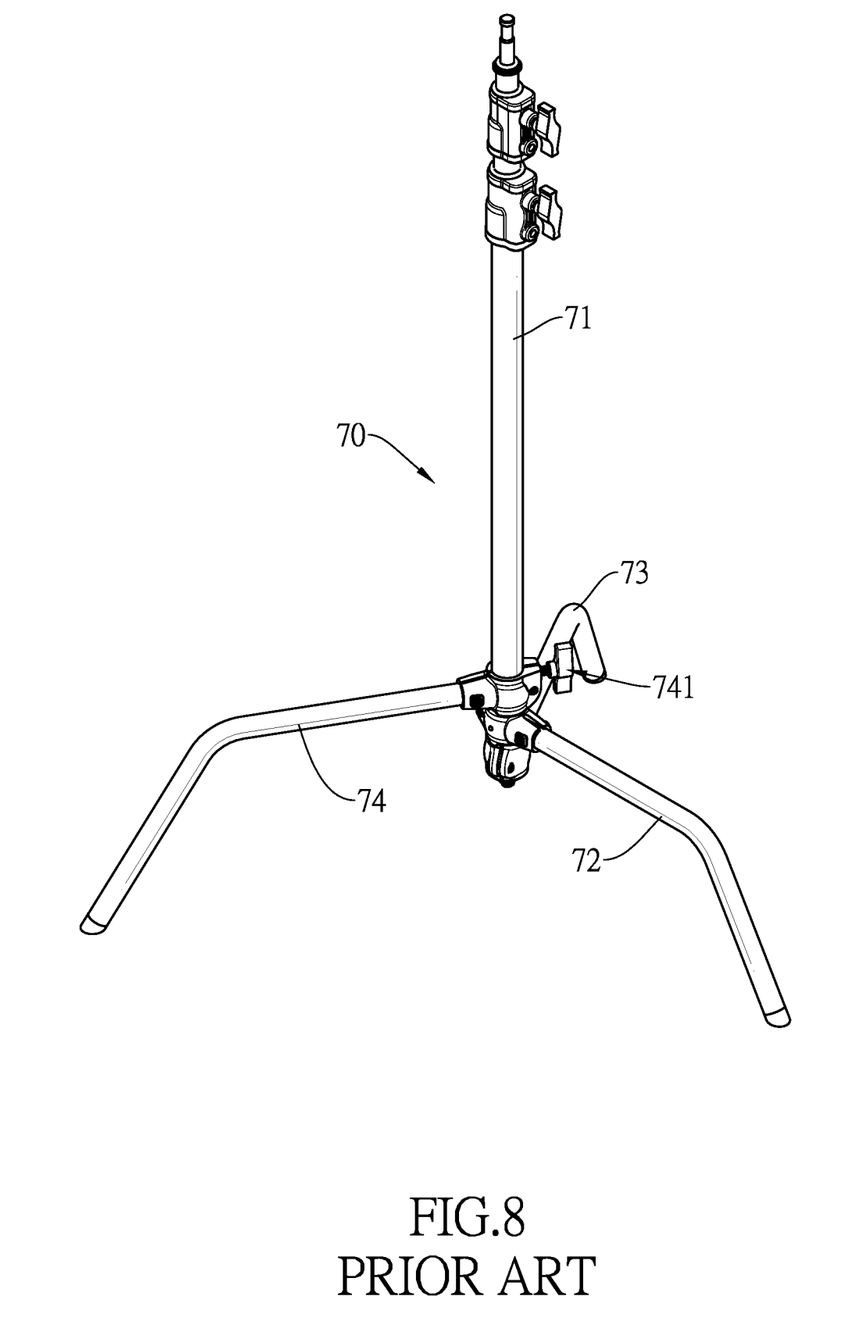
FIG. 8 is a perspective view of a conventional tripod in accordance with the prior art.

With reference to FIG. 8, a conventional tripod 70 for supporting a flash unit or a camera comprises an upright rod 71, a stationary rod 72, a rotatable rod 73, and a slidable rod 74. The upright rod 71 extends longitudinally. The stationary rod 72 extends along a radial direction of the upright rod 71 and has an end securely mounted to the upright rod 71.

Figure 9:
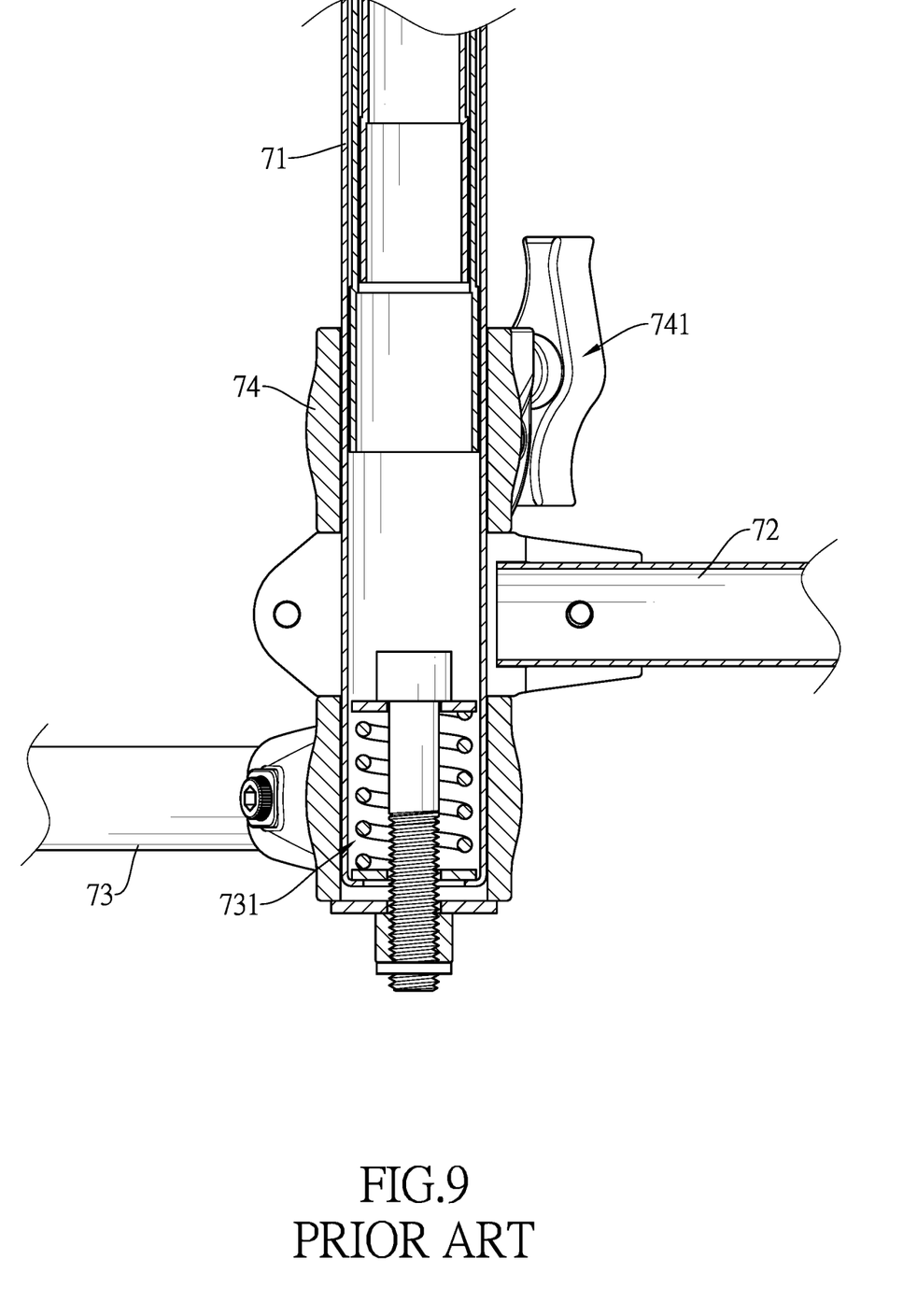
FIG. 9 is an enlarged cross-sectional side view of the conventional tripod in FIG. 8.

With further reference to FIG. 9, the rotatable rod 73 extends along a radial direction of the upright rod 71 and has an end rotatably mounted on the upright rod 71. The rotatable rod 73 and the stationary rod 72 releasably engage with each other via positioning protrusions and positioning recesses, such that the rotatable rod 73 is able to pivot on the upright rod 71, being open relative to the stationary rod 72 and be held at a folding position and an unfolding position by a first forced tightening mechanism 731.

Figure 10:
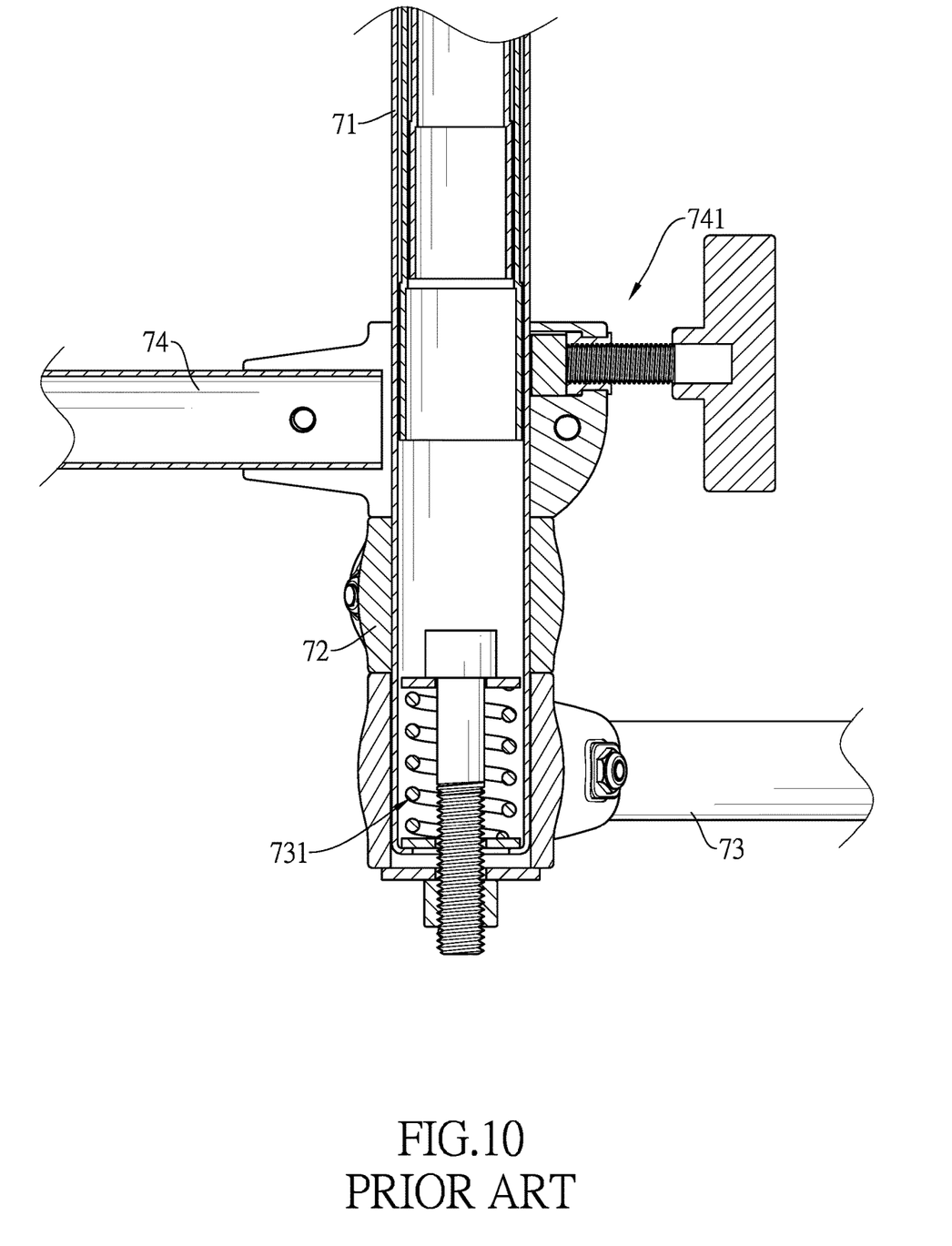
FIG. 10 is another enlarged cross-sectional side view of the conventional tripod in FIG. 8.

With further reference to FIG. 10, the slidable rod 74 extends along a radial direction of the upright rod 71 and has an end rotatably and slidably mounted on the upright rod 71. The slidable rod 74 is able to be held at a suitable height position and a suitable angular position on the upright rod 71 by a second forced tightening mechanism 741.

When unfolding the conventional tripod 70, the rotatable rod 73 pivots to be open relative to the stationary rod 71 and is held at the unfolding position by the first forced tightening mechanism 731, the height position and the angular position of the slidable rod 74 is adjusted according to terrain surrounding the conventional tripod, and then the slidable rod 74 is held at the suitable height position and the suitable angular position by the second forced tightening mechanism 741. Thus, the conventional tripod can stably stand on an uneven ground for supporting the flash unit or the camera.

However, since the first forced tightening mechanism 731 that should be manually operated is needed to hold the rotatable rod 73 at the unfolding position or the folding position, it is time consuming and troublesome to unfold or fold the conventional tripod.

To overcome the shortcomings, the present invention provides a tripod to mitigate or obviate the aforementioned problems.

SUMMARY OF THE INVENTION

The main objective of the present invention is to provide a tripod that has an upright rod, a stationary rod, a rotatable rod, a slidable rod, and a positioning assembly.

The an upright rod is tubular, has a first through hole and a second through hole separately arranged along an axial direction of the upright rod, and has a mounting base securely mounted in the upright rod and corresponding in position to the first through hole and the second through hole.

The stationary rod extends along a radial direction of the upright rod and has a connecting end securely mounted to the upright rod.

The rotatable rod extends along the radial direction of the upright rod and has a connecting end rotatably mounted on the upright rod and a positioning hole selectively aligning with the first through hole of the upright rod.

The slidable rod extends along the radial direction of the upright rod and having a connecting end rotatably and slidably mounted on the upright rod.

The positioning assembly is mounted inside the upright rod and includes a locking element and at least one compression spring. The locking element is mounted in the mounting base, is slidable along a radial direction of the upright rod, and has a first locking protrusion aligning with the first through hole and a second locking protrusion aligning with the second through hole. The second locking protrusion has a distal end surface being inclined and facing upward to the connecting end of the slidable rod. Each of the at least one compression spring has two ends abutting the mounting base and the locking element respectively.

With the positioning assembly mounted in the upright rod, the rotatable rod is able to pivot on the upright rod from a folding position to an unfolding position to allow the positioning hole of the rotatable rod to align with the first through hole of the upright rod. As a height position of the slidable rod is adjusted, the locking element that is pressed by the connecting end of the slidable rod is released and is pushed by the at least one compression spring to allow the first locking protrusion to protrude into the positioning hole of the rotatable rod to fix the rotatable rod at the specific angular position. Accordingly, it is convenient and time saving for a user to unfold or fold the tripod.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
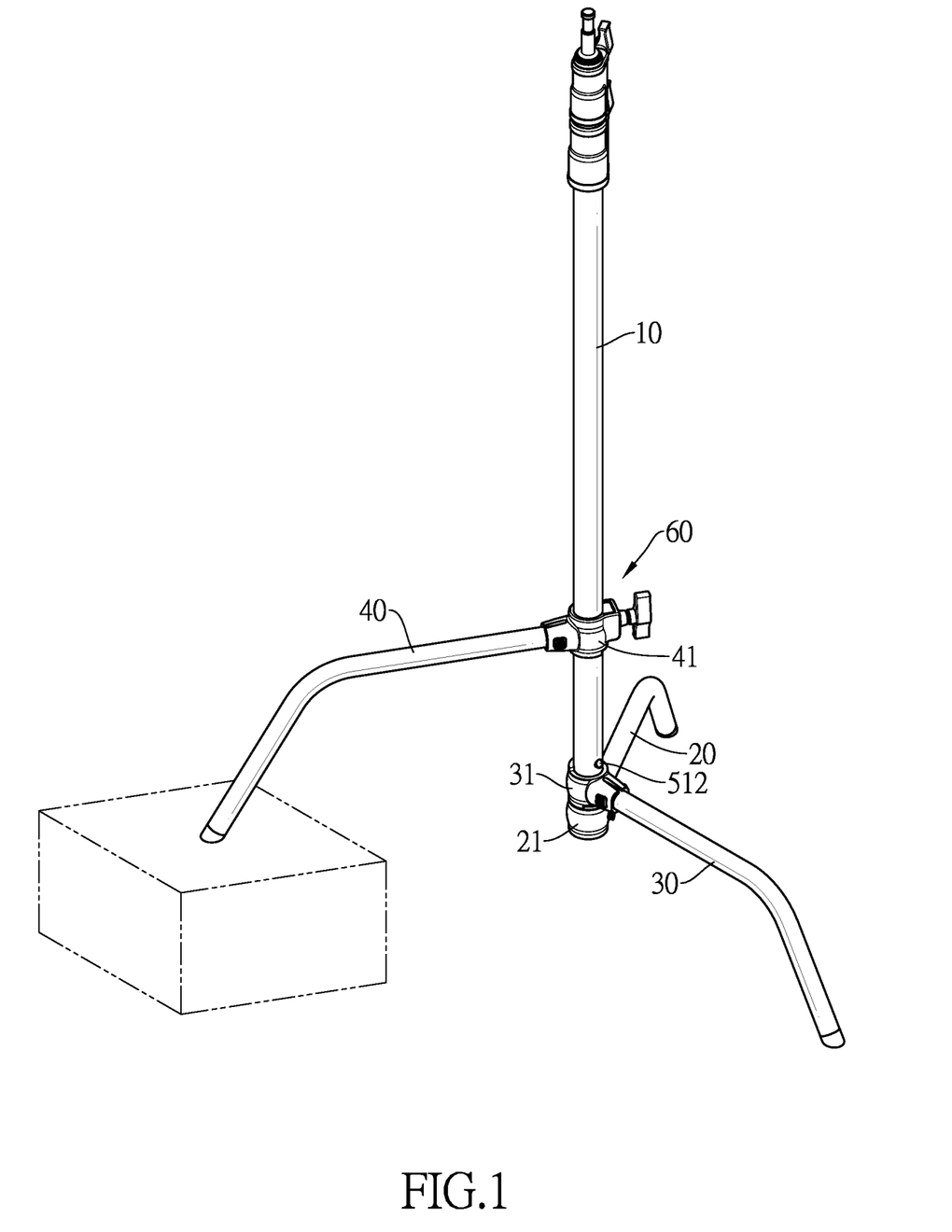
FIG. 1 is an operational perspective view of a tripod in accordance with the present invention.
Figure 2:
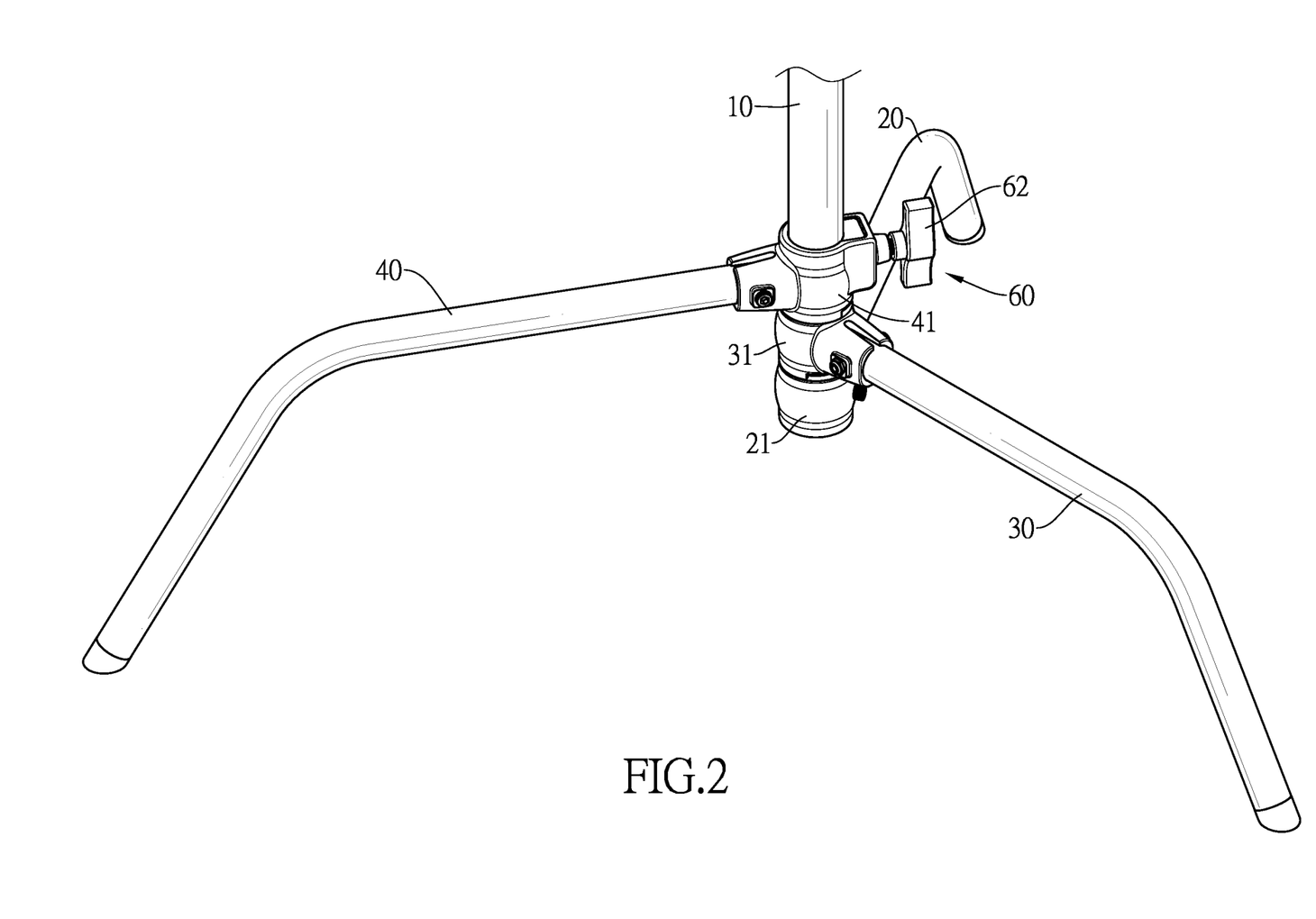
FIG. 2 is an enlarged perspective view of the tripod in FIG. 1.
Figure 3:
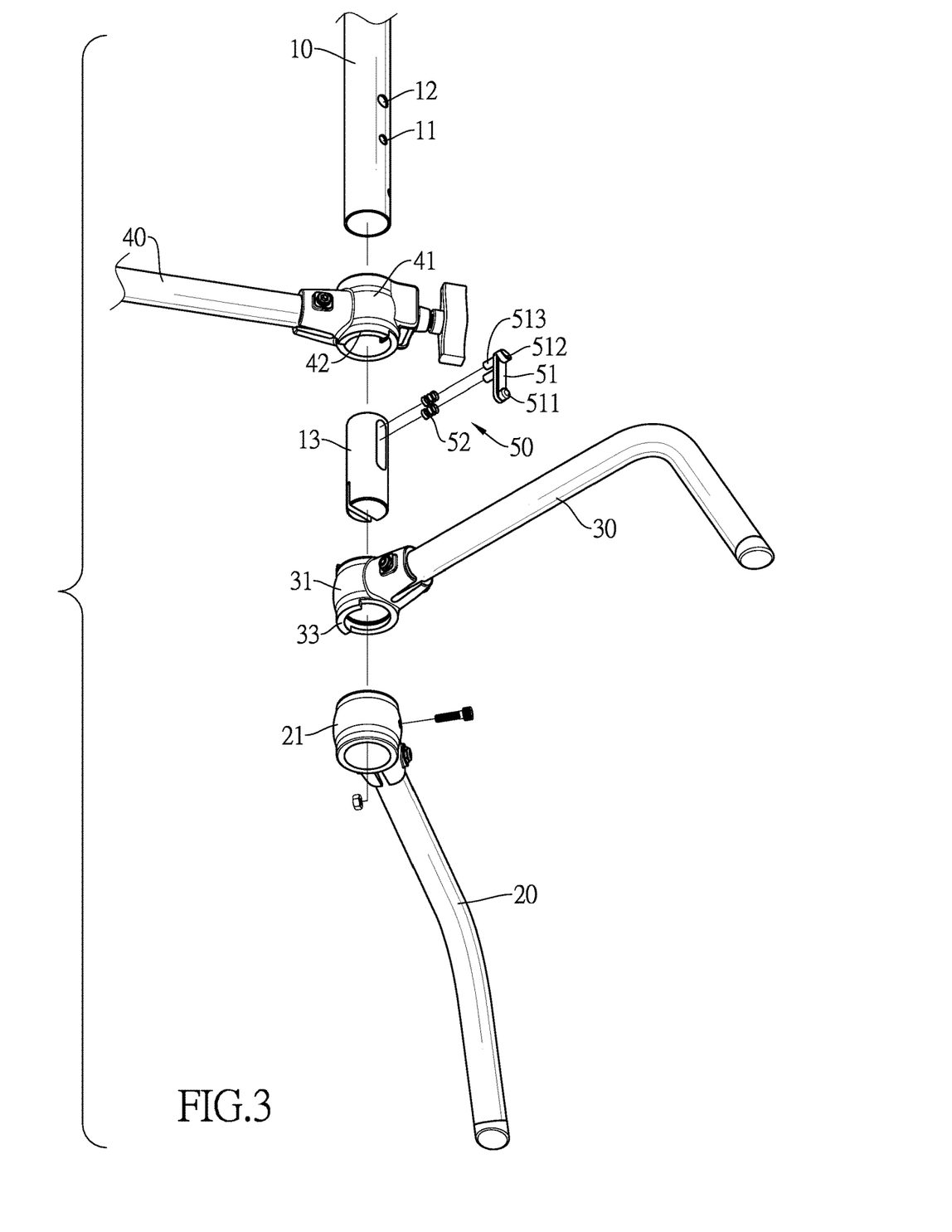
FIG. 3 is an enlarged exploded perspective view of the tripod in FIG. 1.

With reference to FIGS. 1 to 3, a tripod in accordance with the present invention comprises an upright rod 10, a stationary rod 20, a rotatable rod 30, a slidable rod 40, a positioning assembly 50, and a holding assembly 60.

The upright rod 10 is tubular, extends longitudinally, and has a sidewall, a first through hole 11, a second through hole 12, and a mounting base 13. The first through hole 11 and the second through hole 12 are formed through the sidewall of the upright rod 10 and are separately arranged along an axial direction of the upright rod 10. The mounting base 13 is securely mounted in the upright rod 10 and corresponds in position to the first through hole 11 and the second through hole 12.

The stationary rod 20 extends along a radial direction of the upright rod 10 and has a connecting end 21 mounted to and securely connected with the upright rod 10.

Figure 5:
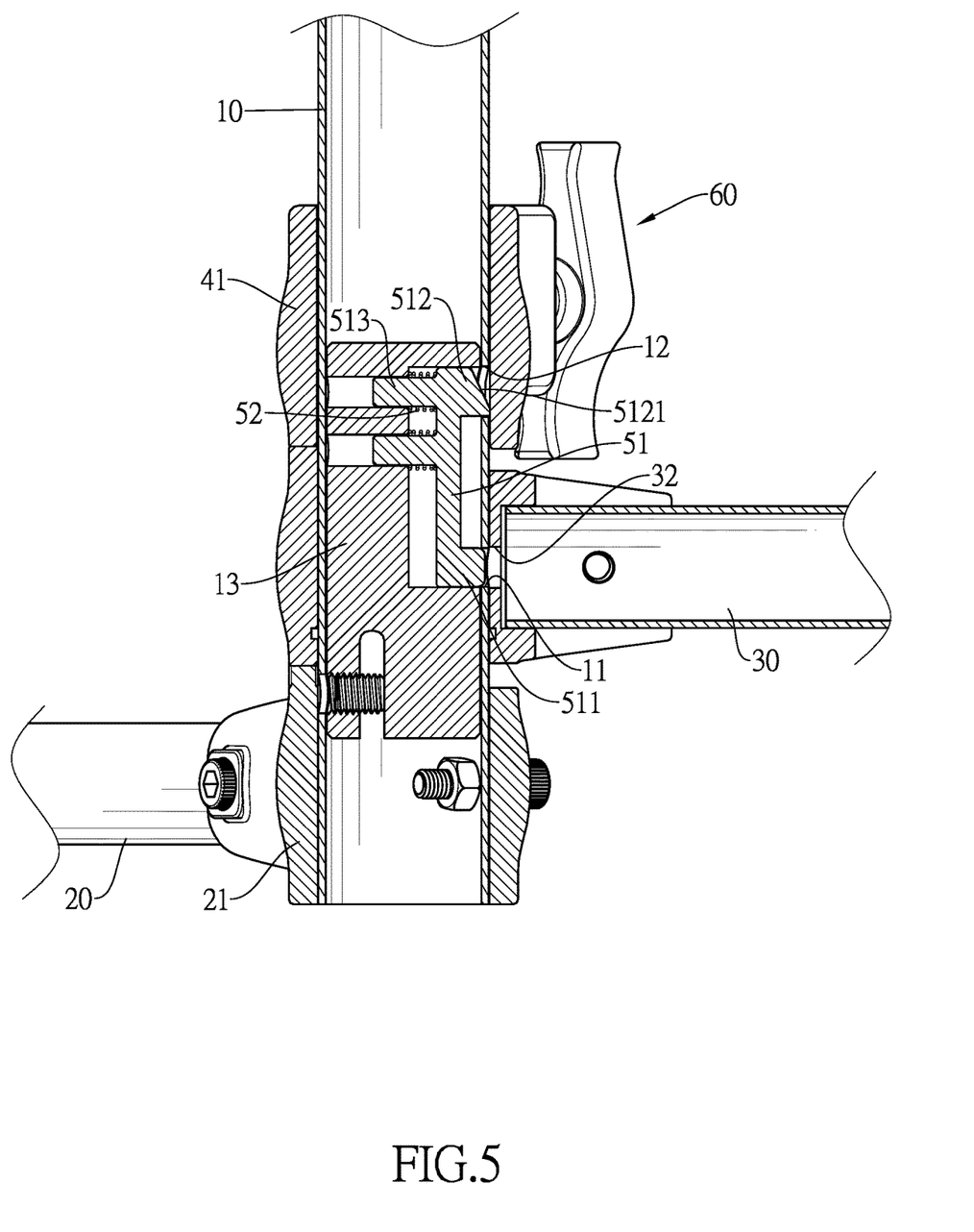
FIG. 5 is a first enlarged cross-sectional side view of the tripod in FIG. 1, showing a rotatable rod and a slidable rod being unlocked.

With further reference to FIG. 5, the rotatable rod 30 extends along the radial direction of the upright rod 10 and has a connecting end 31 and a positioning hole 32. The connecting end 31 of the rotatable rod 30 is rotatably mounted on the upright rod 10. The positioning hole 32 is formed through a sidewall of the connecting end 31 of the rotatable rod 30. When the rotatable rod 30 pivots on the upright rod 10 to be open at a first angle relative to the stationary rod 20, the positioning hole 32 aligns with the first through hole 11 of the upright rod 10.

Preferably, the first angle between the rotatable rod 30 and the stationary rod 20 may be 120 degrees. That is, when the rotatable rod 30 pivots on the upright rod 10 to be open at a first angle of 120 degrees between the rotatable rod 30 and the stationary rod 20, the positioning hole 32 aligns with the first through hole 11 of the upright rod 10.

Figure 4:
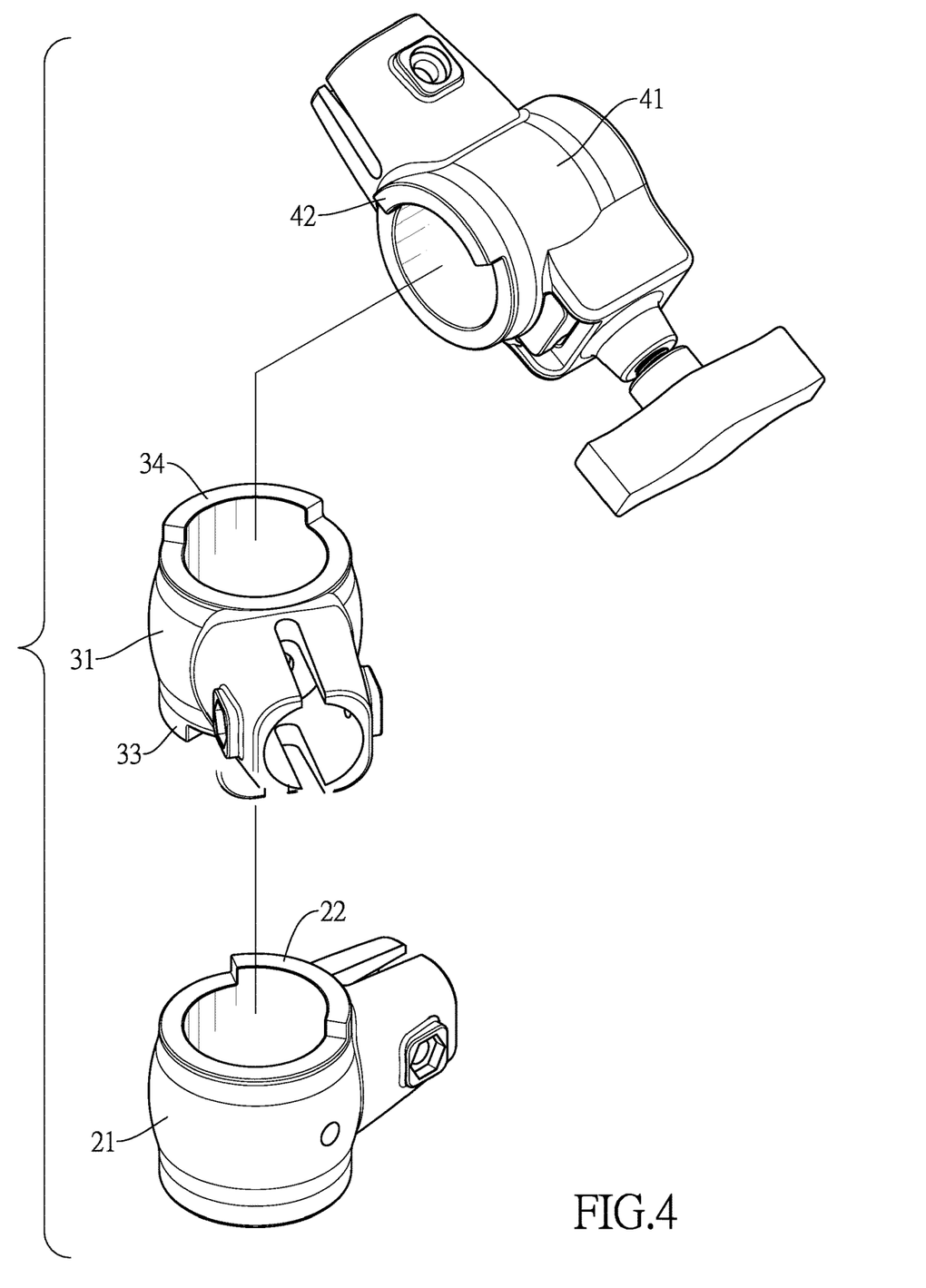
FIG. 4 is another enlarged exploded perspective view of the tripod in FIG. 1.

With reference to FIGS. 3 and 4, in the preferred embodiment, the stationary rod 20 further has a first limiting protrusion 22 disposed on the connecting end 21 of the stationary rod 20 and the rotatable rod 30 further has a second limiting protrusion 33 disposed on the connecting end 31 of the rotatable rod 30. When the rotatable rod 30 pivots on the upright rod 10, the rotatable rod 30 is limited to pivot within an angular range with the second limiting protrusion 33 abutting against the first limiting protrusion 22 on the stationary rod 20. Specifically, when the rotatable rod 30 pivots until the second limiting protrusion 33 abuts against the first limiting protrusion 22, the rotatable rod 30 is open at the first angle relative to the stationary rod 20.

The slidable rod 40 also extends along the radial direction of the upright rod 10 and has a connecting end 41 rotatably and slidably mounted on the upright rod 10. As shown in FIG. 1, by adjusting a height position of the slidable rod 40, the tripod of the present invention can stably stand on an uneven place such as stairs, so as to increase flexibility of the tripod in use.

As shown in FIG. 4, in the preferred embodiment, the rotatable rod 30 further has a first positioning protrusion 34 disposed on the connecting end 31 of the rotatable rod 30 and the slidable rod 40 further has a second positioning protrusion 42 disposed on the connecting end 41 of the slidable rod 40. When the slidable rod 40 overlaps with the rotatable rod 30, the slidable rod 40 and the rotatable rod 30 are limited to pivot relative to each other within an angular range with the second positioning protrusion 42 and the first positioning protrusion 34 abutting against each other. The first limiting protrusion 22 on the stationary rod 20, the second limiting protrusion 33 and the first positioning protrusion 34 on the rotatable rod 30, and the second positioning protrusion 42 on the slidable rod 40 allow the rotatable rod 30 and the slidable rod 40 to be open to specific angles quickly. Preferably, the stationary rod 20, the rotatable rod 30 and the slidable rod 40 are set to 120 degrees apart when the tripod is unfolded, so as to save the time for setting the tripod.

Figure 6:
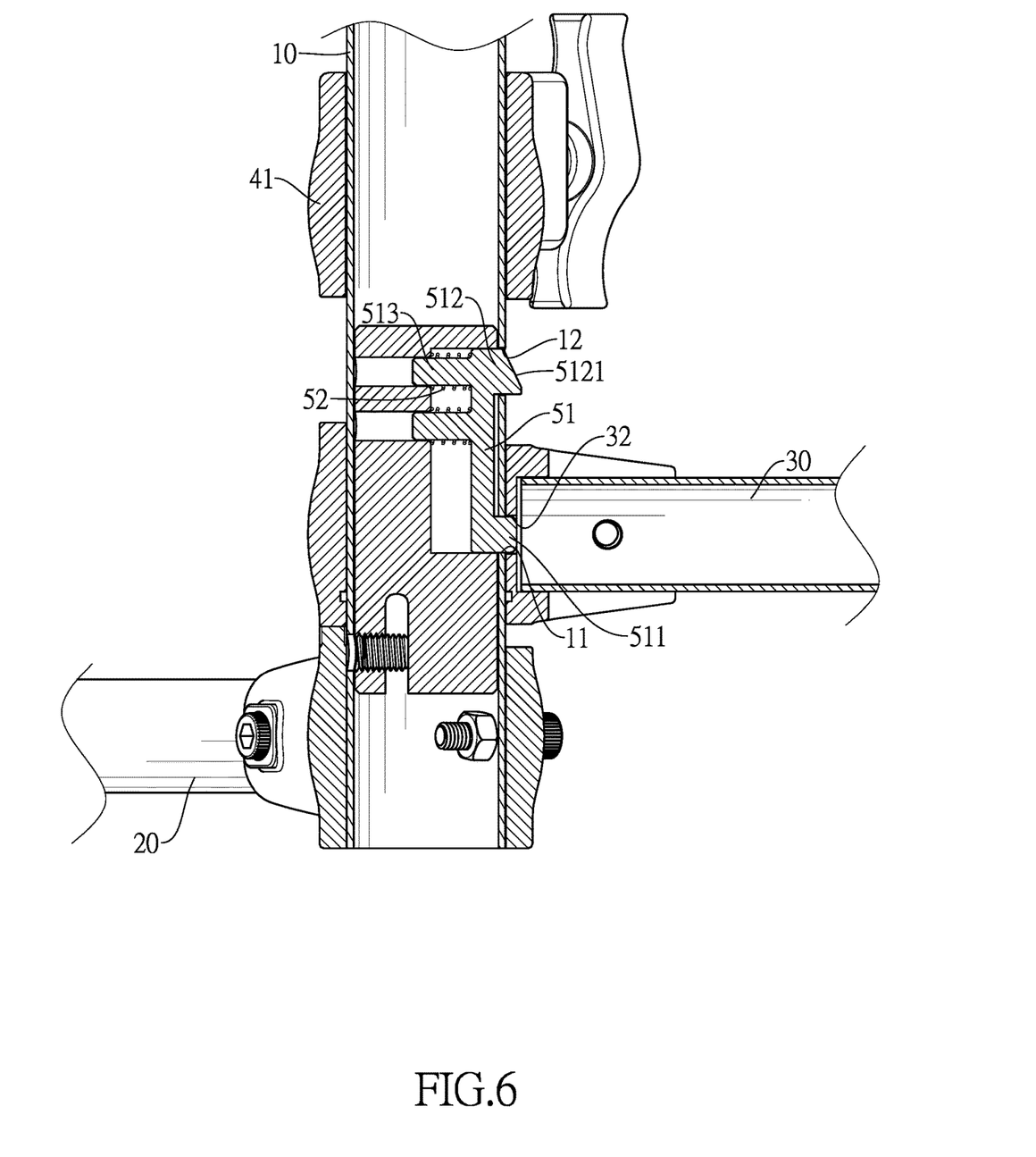
FIG. 6 is the first enlarged cross-sectional side view of the tripod in FIG. 1, showing the rotatable rod and the slidable rod being locked.

With further reference to FIGS. 5 and 6, the positioning assembly 50 is mounted inside the upright rod 10 and includes a locking element 51 and at least one compression spring 52.

The locking element 51 is mounted in the mounting base 13 and is slidable along a radial direction of the upright rod 10. The locking element 51 has a first locking protrusion 511, a second locking protrusion 512, and at least one mounting protrusion 513. The first locking protrusion 511 protrudes from a front side of the locking element 51, and aligns with and selectively protrudes in the first through hole 11. The second locking protrusion 512 protrudes from the front side of the locking element 51, and aligns with and selectively protrudes in the second through hole 12. The second locking protrusion 512 has a distal end surface 5121 being inclined and facing upward to the connecting end 41 of the slidable rod 40. The mounting protrusion 513 protrudes from a rear side of the locking element 51.

Each of the at least one compression spring 52 is mounted around a corresponding one of the at least one mounting protrusion 513 and has two ends abutting the mounting base 13 and the locking element 51 respectively. Thus, the at least one compression spring 52 pushes the locking element 51 to allow the first locking protrusion 511 and the second locking protrusion 512 to stably protrude in the first through hole 11 and the second through hole 12 respectively.

The mounting base 13 limits the locking element 51 to only slide along the radial direction of the upright rod 10. Moreover, when the positioning hole 32 of the rotatable rod 30 aligns with the first through hole 11 of the upright rod 10, the first locking protrusion 511 further protrudes into the positioning hole 32 of the rotatable rod 30, so as to lock the rotatable rod 30 at a specific angular position.

In the preferred embodiment, the at least one compression spring 52 includes two compression springs 52 and the at least one mounting protrusion 513 of the locking element 51 includes two mounting protrusions 513. The two compression springs 52 are mounted around the two mounting protrusions 513 respectively. However, numbers of the compression springs 52 and the mounting protrusions 513 of the locking element 51 are limited to two. With more than two compression springs 52 pushing the locking element 51 at different positions, the locking element 51 is able to stably slide along the radial direction of the upright rod 10, so as to prevent the locking element 51 from becoming oblique and being stuck in the first through hole 11 or the second through hole 12.

Figure 7:
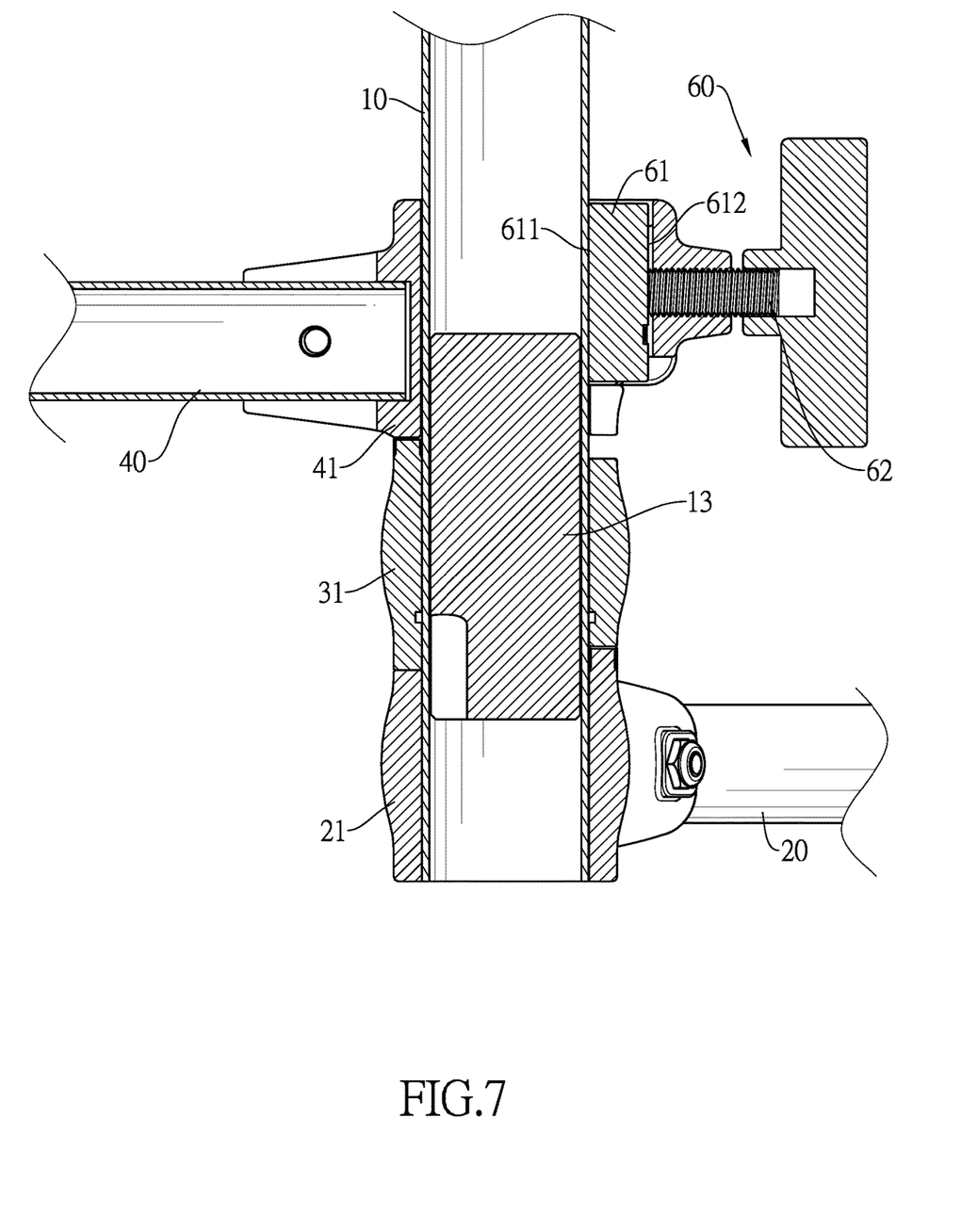
FIG. 7 is a second enlarged cross-sectional side view of the tripod in FIG. 1.

With further reference to FIG. 7, the holding assembly 60 is disposed on the slidable rod 40 and the upright rod 10 and selectively holds the upright rod 10 to secure the height position of the slidable rod 40 on the upright rod 10.

Specifically, the holding assembly 60 includes an abutting pad 61 and a pushing screw 62.

The abutting pad 61 is mounted in the connecting end 41 of the slidable rod 40 and selectively abuts on the upright rod 10. The abutting pad 61 has an abutting surface 611 and a pushed surface 612 oppositely defined on the abutting pad 61. The abutting surface 611 faces the upright rod 10 and corresponds in shape to an outer side surface of the upright rod 10. When the abutting pad 61 abuts on the upright rod 10, the whole abutting surface 611 contacts the outer side surface of the upright rod 10. Thus, the abutting pad 61 is able to apply a uniform pushing force onto the upright rod 10.

The pushing screw 62 is mounted through the connecting end 41 of the slidable rod 40 and abuts against the pushed surface 612 of the abutting pad 61. The pushing screw 62 and the connecting end 41 of the slidable rod 40 are connected with each other via threads. With the pushing screw 62 that pushes the abutting pad 61, the abutting pad 61 closely contacts the outer side surface of the upright rod 10, such that the slidable rod 40 can be securely held on the upright rod 10.

The abutting pad 61 allows the pushing force from the pushing screw 62 to be uniformly applied onto the upright rod 10 through the abutting surface 611 of the abutting pad 61, so as to prevent scratches or indentations being formed on the outer side surface of the upright rod 10 due to concentrated pushing force. However, structure of the holding assembly 60 is not limited to the above-described structure, and may also be other assemblies, such as a quick release latch, that are able to securely hold the slidable rod 40 on the upright rod 10.

With reference to FIG. 5, when the slidable rod 40 slides along the upright rod 10 to allow the connecting end 41 of the slidable rod 40 overlaps with the connecting end 31 of the rotatable rod 30, the connecting end 41 of the slidable rod 40 moves along the distal end surface 5121 of the second locking protrusion 512 of the locking element 51 to press the second locking protrusion 512 as well as the first locking protrusion 511 into the upright rod 10.

In this way, the rotatable rod 30 is able to pivot on the upright rod 10 to unfold or fold relative to the stationary rod 20. Moreover, when the tripod is folded, with the holding assembly 60 that securely hold the slidable rod 40 on the upright rod 10, the rotatable rod 30 can be held between the stationary rod 20 and the slidable rod 40. With the first limiting protrusion 22 on the stationary rod 20, the second limiting protrusion 33 and the first positioning protrusion 34 on the rotatable rod 30, and the second positioning protrusion 42 on the slidable rod 40, the rotatable rod 30 and the slidable rod 40 can be accurately stayed at folding positions.

With reference to FIG. 6, when the slidable rod 40 slides along the upright rod 10 to depart from the rotatable rod 30 to adjust the height position of the slidable rod 40, the second locking protrusion 512 of the locking element 51 is released from the connecting end 41 of the slidable rod 40. Meanwhile, if the rotatable rod 30 has been unfolded to allow the positioning hole 32 of the rotatable rod 30 to align with the first through hole 11 of the upright rod 10, the locking element 51 would be pushed by the at least one compression spring 52 to allow the first locking protrusion 511 of the locking element 51 to engage in the positioning hole 32 of the rotatable rod 30. Accordingly, the rotatable rod 30 can be locked at the specific angular position.

The tripod as described has the following advantages. With the positioning assembly 50 mounted in the upright rod 10, the rotatable rod 30 is able to pivot on the upright rod 10 from a folding position to an unfolding position to allow the positioning hole 32 of the rotatable rod 30 to align with the first through hole 11 of the upright rod 10. As the height position of the slidable rod 40 is adjusted, the locking element 51 that is pressed by the connecting end 41 of the slidable rod 40 is released and is pushed by the at least one compression spring 52 to allow the first locking protrusion 511 to protrude into the positioning hole 32 of the rotatable rod 32 to fix the rotatable rod 30 at the specific angular position. Accordingly, it is convenient and time saving for a user to unfold or fold the tripod.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A tripod comprising:
    an upright rod being tubular and having
        a first through hole formed through a sidewall of the upright rod;
        a second through hole formed through the sidewall of the upright rod, and the first through hole and the second through hole separately arranged along an axial direction of the upright rod; and
        a mounting base securely mounted in the upright rod and corresponding in position to the first through hole and the second through hole;
    a stationary rod extending along a radial direction of the upright rod and having a connecting end, and the connecting end of the stationary rod securely mounted to the upright rod;
    a rotatable rod extending along the radial direction of the upright rod and having
        a connecting end rotatably mounted on the upright rod; and
        a positioning hole formed through a sidewall of the connecting end of the rotatable rod and selectively aligning with the first through hole of the upright rod;
    a slidable rod extending along the radial direction of the upright rod and having a connecting end, and the connecting end of the slidable rod rotatably and slidably mounted on the upright rod; and
    a positioning assembly mounted inside the upright rod and including
        a locking element mounted in the mounting base and being slidable along a radial direction of the upright rod, and the locking element having
            a first locking protrusion protruding from a front side of the locking element, and aligning with and selectively protruding in the first through hole; and
            a second locking protrusion protruding from the front side of the locking element, aligning with and selectively protruding in the second through hole and having a distal end surface, and the distal end surface of the second locking protrusion being inclined and facing upward to the connecting end of the slidable rod; and
        at least one compression spring, and each of the at least one compression spring having two ends abutting the mounting base and the locking element respectively.

2. The tripod as claimed in claim 1 further comprising: a holding assembly disposed on the slidable rod and the upright rod and selectively holding the upright rod to secure a height position of the slidable rod on the upright rod.

3. The tripod as claimed in claim 2, wherein the holding assembly includes:
    an abutting pad mounted in the connecting end of the slidable rod and selectively abutting on the upright rod; and
    a pushing screw mounted through the connecting end of the slidable rod and abutting against the abutting pad, and the pushing screw and the connecting end of the slidable rod connected with each other via threads.

4. The tripod as claimed in claim 3, wherein the abutting pad of the holding assembly has an abutting surface facint the upright rod and corresponding in shape to an outer side surface of the upright rod.

5. The tripod as claimed in claim 1, wherein
the stationary rod has a first limiting protrusion disposed on the connecting end of the stationary rod; and
the rotatable rod has a second limiting protrusion disposed on the connecting end of the rotatable rod;
wherein when the rotatable rod pivots on the upright rod, the second limiting protrusion selectively abutting against the first limiting protrusion on the stationary rod.

6. The tripod as claimed in claim 2, wherein
the stationary rod has a first limiting protrusion disposed on the connecting end of the stationary rod; and
the rotatable rod has a second limiting protrusion disposed on the connecting end of the rotatable rod;
wherein when the rotatable rod pivots on the upright rod, the second limiting protrusion selectively abutting against the first limiting protrusion on the stationary rod.

7. The tripod as claimed in claim 3, wherein
the stationary rod has a first limiting protrusion disposed on the connecting end of the stationary rod; and
the rotatable rod has a second limiting protrusion disposed on the connecting end of the rotatable rod;
wherein when the rotatable rod pivots on the upright rod, the second limiting protrusion selectively abutting against the first limiting protrusion on the stationary rod.

8. The tripod as claimed in claim 4, wherein
the stationary rod has a first limiting protrusion disposed on the connecting end of the stationary rod; and
the rotatable rod has a second limiting protrusion disposed on the connecting end of the rotatable rod;
wherein when the rotatable rod pivots on the upright rod, the second limiting protrusion selectively abutting against the first limiting protrusion on the stationary rod.

9. The tripod as claimed in claim 1, wherein
the rotatable rod has a first positioning protrusion disposed on the connecting end of the rotatable rod; and
the slidable rod has a second positioning protrusion disposed on the connecting end of the slidable rod;
wherein when the slidable rod overlaps with the rotatable rod, the slidable rod and the rotatable rod are limited to pivot relative to each other within an angular range with the second positioning protrusion and the first positioning protrusion abutting against each other.

10. The tripod as claimed in claim 2, wherein
the rotatable rod has a first positioning protrusion disposed on the connecting end of the rotatable rod; and
the slidable rod has a second positioning protrusion disposed on the connecting end of the slidable rod;
wherein when the slidable rod overlaps with the rotatable rod, the slidable rod and the rotatable rod are limited to pivot relative to each other within an angular range with the second positioning protrusion and the first positioning protrusion abutting against each other.

11. The tripod as claimed in claim 3, wherein
the rotatable rod has a first positioning protrusion disposed on the connecting end of the rotatable rod; and
the slidable rod has a second positioning protrusion disposed on the connecting end of the slidable rod;
wherein when the slidable rod overlaps with the rotatable rod, the slidable rod and the rotatable rod are limited to pivot relative to each other within an angular range with the second positioning protrusion and the first positioning protrusion abutting against each other.

12. The tripod as claimed in claim 4, wherein
the rotatable rod has a first positioning protrusion disposed on the connecting end of the rotatable rod; and
the slidable rod has a second positioning protrusion disposed on the connecting end of the slidable rod;
wherein when the slidable rod overlaps with the rotatable rod, the slidable rod and the rotatable rod are limited to pivot relative to each other within an angular range with the second positioning protrusion and the first positioning protrusion abutting against each other.

13. The tripod as claimed in claim 1, wherein
the locking element further has at least one mounting protrusion protruding from a rear side of the locking element; and
each of the at least one compression spring is mounted around a corresponding one of the at least one mounting protrusion.

14. The tripod as claimed in claim 3, wherein
the locking element further has at least one mounting protrusion protruding from a rear side of the locking element; and
each of the at least one compression spring is mounted around a corresponding one of the at least one mounting protrusion.

15. The tripod as claimed in claim 8, wherein
the locking element further has at least one mounting protrusion protruding from a rear side of the locking element; and
each of the at least one compression spring is mounted around a corresponding one of the at least one mounting protrusion.

16. The tripod as claimed in claim 7, wherein
the locking element further has at least one mounting protrusion protruding from a rear side of the locking element; and
each of the at least one compression spring is mounted around a corresponding one of the at least one mounting protrusion.

17. The tripod as claimed in claim 9, wherein
the locking element further has at least one mounting protrusion protruding from a rear side of the locking element; and
each of the at least one compression spring is mounted around a corresponding one of the at least one mounting protrusion.

18. The tripod as claimed in claim 11, wherein
the locking element further has at least one mounting protrusion protruding from a rear side of the locking element; and
each of the at least one compression spring is mounted around a corresponding one of the at least one mounting protrusion.

* * * * *